United States Patent
Groth et al.

(10) Patent No.: US 12,131,525 B2
(45) Date of Patent: Oct. 29, 2024

(54) MULTI-TASK DEEP LEARNING METHOD FOR A NEURAL NETWORK FOR AUTOMATIC PATHOLOGY DETECTION

(71) Applicant: KONINKLIJKE PHILIPS N.V., Eindhoven (NL)

(72) Inventors: Alexandra Groth, Hamburg (DE); Axel Saalbach, Hamburg (DE); Ivo Matteo Baltruschat, Hamburg (DE); Jens Von Berg, Hamburg (DE); Michael Grass, Buchholz In Der Nordheide (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 286 days.

(21) Appl. No.: 17/620,142

(22) PCT Filed: Jun. 25, 2020

(86) PCT No.: PCT/EP2020/067821
§ 371 (c)(1),
(2) Date: Dec. 17, 2021

(87) PCT Pub. No.: WO2020/260459
PCT Pub. Date: Dec. 30, 2020

(65) Prior Publication Data
US 2022/0319160 A1 Oct. 6, 2022

(30) Foreign Application Priority Data

Jun. 27, 2019 (EP) ..................... 19183052

(51) Int. Cl.
*G06V 10/00* (2022.01)
*G06T 7/00* (2017.01)
(Continued)

(52) U.S. Cl.
CPC ............ *G06V 10/82* (2022.01); *G06T 7/0012* (2013.01); *G06V 10/454* (2022.01);
(Continued)

(58) Field of Classification Search
CPC ............ G06N 3/08; G06N 3/044; G06N 3/02; G06N 3/045; G06N 3/092; G06N 3/0475;
(Continued)

(56) References Cited

U.S. PATENT DOCUMENTS 10,691,980 B1 * 6/2020 Guendel ................... G06T 7/70
10,803,407 B2 * 10/2020 Matsumoto ............. H04L 67/01
(Continued)

OTHER PUBLICATIONS

PCT International Search Report, International application No. PCT/EP2020/067821, Oct. 9, 2020.
(Continued)

*Primary Examiner* — Amir Alavi
(74) *Attorney, Agent, or Firm* — Larry Liberchuk

(57) ABSTRACT

Multi-task deep learning method for a neural network for automatic pathology detection, comprising the steps: receiving first image data (I) for a first image recognition task; receiving (S2) second image data (V) for a second image recognition task; wherein the first image data (I) is of a first datatype and the second image data (V) is of a second datatype, different from the first datatype; determining (S3) first labeled image data ($I_L$) by labeling the first image data (I) and determining second synthesized labeled image data ($I_{SL}$) by synthesizing and labeling the second image data (V); training (S4) the neural network based on the received first image data (I), the received second image data (V), the determined first labeled image data ($I_L$) and the determined second labeled synthesized image data (ISL); wherein the first image recognition task and the second image recognition task relate to a same anatomic region where the respec-
(Continued)

tive image data is taken from and/or relate to a same pathology to be recognized in the respective image data.

10 Claims, 2 Drawing Sheets

(51) Int. Cl.
| | |
|---|---|
| G06V 10/44 | (2022.01) |
| G06V 10/764 | (2022.01) |
| G06V 10/774 | (2022.01) |
| G06V 10/82 | (2022.01) |
| G06V 10/96 | (2022.01) |
| G06V 20/70 | (2022.01) |

(52) U.S. Cl.
CPC .......... *G06V 10/764* (2022.01); *G06V 10/774* (2022.01); *G06V 10/96* (2022.01); *G06V 20/70* (2022.01); *G06T 2207/10081* (2013.01); *G06T 2207/10124* (2013.01); *G06T 2207/20081* (2013.01); *G06T 2207/20084* (2013.01); *G06V 2201/03* (2022.01)

(58) Field of Classification Search
CPC ........ G06N 3/042; G06N 3/082; G06N 3/049; G06V 10/82; G06V 10/96; G06V 10/454; G06V 10/764; G06V 20/70; G06V 2201/03; G16H 50/20; G16H 30/20; G06F 18/24; G06T 2207/20081; G06T 2207/20084
See application file for complete search history.

(56) References Cited

U.S. PATENT DOCUMENTS

| | | | | |
|---|---|---|---|---|
| 10,810,461 | B2 * | 10/2020 | Sugiura | G06V 40/172 |
| 10,867,217 | B1 * | 12/2020 | Madden | G06V 10/764 |
| 11,378,966 | B2 * | 7/2022 | Kim | B25J 11/0085 |
| 11,398,057 | B2 * | 7/2022 | Chang | G06V 10/82 |
| 11,423,228 | B2 * | 8/2022 | Zhao | G06F 40/30 |
| 11,423,878 | B2 * | 8/2022 | Lee | G10L 15/30 |
| 11,514,605 | B2 * | 11/2022 | Zhang | G06N 20/00 |
| 11,605,379 | B2 * | 3/2023 | Han | G10L 15/26 |
| 11,607,801 | B2 * | 3/2023 | Chae | G06N 3/008 |
| 11,676,006 | B2 * | 6/2023 | Das | G10L 15/22 |
| | | | | 706/20 |
| 2018/0005083 | A1 | 1/2018 | Georgescu | |

OTHER PUBLICATIONS

Gundel S. et al., "Multi-Task Learning for Chest X-Ray Abnormality Classification on Noisy Labels", May 2019, XP055635269. Retrieved from the Internet: URL:https://arxiv.org/pdf/1905.06362.pdf.

Moturu A. et al., "Creation of Synthetic X-Rays to Train a Neural Network to Detect Lung Cancer", Aug. 20, 2018, XP055734264. Retrieved from the Internet: URL:http://www.cs.toronto.edu/pub/reports/ na/Project Report Moturu Chang.pdf.

Chang A. et al., "Detecting Early Stage Lung Cancer Using a Neural Network Trained with Patches from Synthetically Generated X-Rays", Jan. 4, 2019, XP055734216. Retrieved from the Internet: URL:http://www.cs.toronto.edu/pub/reports/ na/Project Report Moturu Chang 2.pdf.

He T. et al., "Multi-Task Learning for the Segmentation of Thoracic Organs at Risk in CT Images", Proceedings of the 2019 Challenge on Segmentation of Thoracic Organs at Risk in CT Images (SegTHOR2019) CEUR Workshop Proceedings, Apr. 23, 2019 (Apr. 23, 2019), XP055635282.

Moeskops P. et al., "Deep Learning for Multi-Task Medical Image Segmentation in Multiple Modalities", arxiv.org, Cornell University Library, 201 Olin Library Cornell University Ithaca, NY 14853, Apr. 11, 2017, XP080762303.

Islam M.T. et al., "Abnormality Detection and Localization in Chest X-Rays Using Deep Convolutional Neural Networks", Computer Vision and Pattern Recognition (cs.CV), Sep. 27, 2017. https://arxiv.org/pdf/1705.09850.pdf.

Ruder S. et al., "An Overview of Multi-Task Learning in Deep Neural Networks", Computer Science Mathematics, Jun. 15, 2017. http://ruder.io/multi-task/.

Chent S. et al., "Automatic Scoring of Multiple Semantic Attributes With Multi-Task Feature Leverage: A Study on Pulmonary Nodules in CT Images", IEEE Transactions on Medical Imaging, vol. 36, No. 3, pp. 802-814, Mar. 2017.

* cited by examiner

MULTI-TASK DEEP LEARNING METHOD FOR A NEURAL NETWORK FOR AUTOMATIC PATHOLOGY DETECTION

FIELD OF THE INVENTION

The invention relates to a multi-task deep learning method for a neural network for automatic pathology detection, to a device, to a computer program and to a computer readable medium.

BACKGROUND OF THE INVENTION

In current clinical practice, the need for automatization has become more and more important in order to be cost efficient or to spare that radiologist tedious routine tasks. One of these tasks is the assessment of x-ray acquisitions. The detection of a certain disease on the x-ray synthesis can be considered as a justification task. Currently, machine learning algorithms like neutral networks based on deep learning methods are more and more used for such purposes in different fields of application. Training of the neural network requires a large amount of annotated training data. Their success is substantially based on this broad training database. Therefore most of the traditional deep learning approaches successfully use pre-trained networks from the computer vision domain.

SUMMARY OF THE INVENTION

There may therefore be a need for an improved learning method for a neural network for automatic pathology detection.

The object of the present invention is solved by the subject matter of the independent claims where further embodiments are incorporated in the dependent claims. It should be noted that the following described aspect of the invention equally applies to the multi-task deep learning method, to the device, to the computer program and to the computer readable medium.

According to an aspect, a multi-task deep learning method for a neural network for automatic pathology detection is provided. The method comprises the steps receiving first image data for a first image recognition task, receiving second image data for a second image recognition task, wherein the first image data is of a first datatype and the second image data is of a second datatype, different from the first datatype, determining first labeled image data by labeling the first image data and determining second labeled synthesized image data by synthesizing and labeling the second image data and training the neural network based on the received first image data, the received second image data, the determined first labeled image data and the determined second labeled synthesized image data, wherein the first image recognition task and the second image recognition task relate to a same anatomic region where the respective image data is taken from and/or relate to a same pathology to be recognized in the respective image data.

Preferably, both the first image data and the second image data are determined from the same region of a patient, in particular from the chest region of the patient.

Preferably, the neural network is trained by a multi-task deep learning algorithm.

The term "synthesizing", as used herein, comprises methods for data selection, geometric transformation, including forward projection, physical simulations for the conversion of the data and/or application of deep learning methods in combination with image processing techniques for resizing and registration. Determining sysnthesized image data via forward projection (i.e. for the generation of Digitally Reconstructed Radiographs from CT images), preferably comprises Ray Casting and Splatting techniques. Specifically using Ray Casting the attenuation coefficient of the CT image are integrated along the path from a hyptothetic X-ray source to a detector in order to approximate the principles of X-ray image formation. In other words, the second image data of a second datatype are converted ito a first datatype of first image data, or at least a similar datatype, wherein the first image data and the second image data can be mutually, in particular simoultaneously, processed. Preferably the respective image datatype are similar in view of pixel resolution and/or synthesis geometry.

The term "multi-task deep learning method", as used herein, comprises a deep learning method that allows for using all different types of input data other than the finally used input data during application of the method. By sharing representations between related tasks, the model can be improved on the original task. Multi-task deep learning preferably comprises hard parameter sharing or soft parameter sharing. Hard parameter sharing comprises sharing of intermediate layers between all tasks, while keeping several task-specific output layers. Soft parameters sharing comprises regulating a distance between the parameters of the model to converge the parameters, wherein for each task an own model with its own parameters is present.

Preferably, training the neural network based on the received first image data, the received second image data, the determined first labeled image data and the determined second labeled synthesized image data comprises training the neural network simoultaneously on the the received first image data, the received second image data, the determined first labeled image data and the determined second labeled synthesized image data.

Thus, by synthesizing, in particular forward projecting, the second image data into image data that have a similar datatype than the first image data, the multi-task-deep learning method can process the first image data and the second image data simultanieously.

The terms "labeled image data" and "labeling" can also be referred to as "annotation data" and "annotating".

Label information for training the neural network can be obtained from radiologists in terms of identified diseases and clinical measurements, for example using radiology reports, and/or segmentations, in particular semi-automatic segmentations. Consequently, label information is determined manually by radiologists based on provided first image data and/or second image data. Alternatively, label information is automatically derived from radiology reports, for example by using natural language processing algorithms or image segmentation algorithms. In an alternative embodiment, the second image data is automatically labeled. Based on those automatically determined labels, laber information for the labeled synthesized image data are derived. In other words, during the syntehsis of the second image data, the automatically determined label information of the second image data is synthesized into label information of the labeled synthesized image data.

The term "datatype", as used herein, relates to imaging modalities, for example, computer tomography imaging and/or magnetic resonance imaging, and/or different acquisition rotocols.

The second image recognition task can also be described as auxiliary image recognition task, wherein the first image recognition task for generating the training data is identical with the image recognition task of the later application and the second image recognition task for generating the training data is only similar to the imagination task of the later application.

Preferably, the first image recognition task and in the second image recognition task can be almost identical, for example detection of chest pathologies, however an auxiliary image recognition task could also be modality specific, for example precise localization of landmarks which are not directly visible in synthesized images.

For example, if emphysema should be detected in a lung, in X-ray images, such emphysema are hardly detectable. However, in a computer tomography image, emphysema are comparably easy to detect. Thus, in the computer tomography image, the emphysema can easily be labeled. Consequently, a computer tomography image that is forward projected into the image type of the X-ray image can provide a high quality ground truth of the empysema in the image data for a machine learning algorithm.

Thus, different tasks of data are taken into account for model training other than the type of data on which the medical problem has to be solved on.

Thus, labeled image data with a much higher quality in the training process can be determined.

Thus, not only different data sources can be employed but the neural network can also be optimized with respect to different but related image recognition tasks.

Thus, the training data for the neural network can be improved and thus, the learning method for a neural network for automatic pathology detection can be improved. In a preferred embodiment, the method comprises the following steps: determining synthesized second image data by synthesizing the second image data into the first datatype and/or first dimension, and determining the second labeled synthesized image data by labeling the synthesized second image data. Preferably forward projection comprises.

Preferably, synthesizing, in particular forward projection, comprises selection of a subset of the data, physical simulations for the conversion of the data and/or application of deep learning methods such as cycle GANs in combination with image processing techniques for resizing and registration.

Determining synthesized image data preferably comprises selecting single slices out of a 3D image data, in particular of a 3D computer tomography image, and resizing them by interpolation and/or by an artificial forward synthesis to a 2D image, in particular of a 2D X-ray image, with the correct dimensions.

For classification tasks the labeled image data can be used directly, wherein for example for detection tasks, including segmentation, labeled image data has to be synthesized.

Thus, the training data for the neural network can be determined by different modalities and thus, the learning method for a neural network for automatic pathology detection can be improved.

Preferably, the 3D image data is forward synthesized into a 2D synthesis geometry which is closely related to the geometry of the 2D image data, in particular in view of pixel resolution and/or pixel geometry.

Additionally, if a data size of the first image data and a size of the second image data is not identical, a size synthetization, in particular by synthesizing of the second image data, into the same data size has to be performed prior to the training.

Additionally, if the properties of the first image data with respect to field of view, size or resolution is not comparable to the second image data, additional post-processing methods such as resampling have to be employed.

Thus, the training data for the neural network can be determined by different modalities and thus, the learning method for a neural network for automatic pathology detection can be improved.

In a preferred embodiment, the method comprises the following steps: determining second labeled image data by labeling the second image data and determining the second labeled synthesized image data by synthesizing the second labeled image data into the first datatype and/or dimension of the first image data.

Preferably, synthesizing comprises selection of a subset of the data, physical simulations for the conversion of the data and/or application of deep learning methods such as cycle GANs in combination with image processing techniques for resizing and registration.

Synthesizing the second image data comprises selecting single slices out of the 3D image data and resizing them by interpolation and/or by an artificial forward synthesis to a 2D image with the correct dimensions.

For classification tasks the labeled image data can be used directly, wherein for example for detection tasks, including segmentation, labeled image data has to be synthesized.

Thus, the training data for the neural network can be determined by different modalities and thus, the learning method for a neural network for automatic pathology detection can be improved.

Preferably, the 3D image data is forward synthesized into a 2D synthesis geometry which is closely related to the geometry of the 2D image data, in particular in view of pixel resolution and/or pixel geometry.

Additionally, if a data size of the first image data and a size of the second image data is not identical, a size synthetization, in particular by synthesizing of the second image data, into the same data size has to be performed prior to the training.

Additionally, if the properties of the first image data with respect to field of view, size or resolution is not comparable to the second image data, additional post-processing methods such as resampling have to be employed.

Thus, the training data for the neural network can be determined by different modalities and thus, the learning method for a neural network for automatic pathology detection can be improved.

In a preferred embodiment, the first image recognition task and/or the second image recognition task comprises classification, localization and/or segmentation.

Preferably, the first image recognition task and/or the second image recognition task comprises classification, localization, object detection, semantic segmentation and/or instance segmentation. The term "classification" relates to given an image with an object, finding out what the object is. In other words, classifying it in a class from a set of predefined categories. The term "localization" relates to finding where the object is and drawing a bounding box around it. The term "object detection" relates to classifying and detecting all objects in the image as well as assigning a class to each object and drawing a bounding box around it. The term "semantic segmentation" relates to classifying every pixel in the image to a class according to its context, so that each pixel is assigned to an object. The term "instance segmentation" relates to classifying every pixel in the image to a class so that each pixel is assigned to a different instance of an object.

In a preferred embodiment, classification, localization, object detection and/or segmentation relates to a pathology, a foreign object and/or an anatomical region.

In a preferred embodiment, the first datatype comprises 2D image data and the second datatype comprises 3D image data.

Preferably, the 2D image data is determined by X-ray methods and the 3D image data is generated by computer tomography methods.

Alternatively, the first datatype comprises 2D X-ray imaging data and the second datatype comprises 2D X-ray dark-field imaging data. Further alternatively, the first datatype comprises 4D dynamic contrast enhanced magnetic resonance image, MRI, data and the second datatype comprises 3D MRI data.

Thus, the training data for the neural network can be determined by different modalities and thus, the learning method for a neural network for automatic pathology detection can be improved.

In a preferred embodiment, the first image data is of a first dimension and the second image data is of a second dimension, different from the first dimension.

The term "dimension", as used herein, relates to the number of degree of freedom of image elements, for example comprising one dimension, 1D, two dimensions, 2D, three dimensions, 3D, four dimensions, 4D, and so on.

In a preferred embodiment, the first labeled image data and the second labeled synthesized image data comprises an identification and/or a location of a pathology, a foreign object and/or an anatomical region.

In a preferred embodiment, the first image data comprises X-ray image data and the second image data comprises computer tomography image data.

Preferably, a task should be performed on 2D images, in particular X-ray synthesis, whereby the neural network is trained on 2D images, in particular X-ray synthesis, as well as on 3D data, in particular computer tomography image data.

In a care cycle, often different image modalities are used. For example, in screening or emergency settings, often x-ray imaging is used because it is fast and effective and leads to a small dose exposure of the patient. Contrary, image techniques like computer tomography provide quantitative 3D information, which allow for more detailed and accurate diagnosis, however at the expense of a higher dose to the patient and costs. At the same time, they often allow for a much simpler ground truth generation, in particular in case of normal thorax, which can be easily identified using Hounsfield unit values.

Preferably, the x-ray images are subject to substantial transformations, in particular down-sampling for example to 224×224 pixel and/or heuristic intensity transformation.

Thus, in a combined training with data from different sources such as X-ray and computer tomography it can be benefited from the different data characteristics of the different image datatypes, in particular high-volume x-ray images and/or 3D quantitative computer tomography data with definite diagnosis, and allows for development of better diagnostic solutions.

Thus, the computer tomography image data is synthesized into X-ray-like image data.

In a preferred embodiment, the computer tomography image data is synthesized into 2D image data in form of a digitally reconstructed radiograph.

In a preferred embodiment, the pathology comprises one of Cardiomegaly, Emphysema, Edema, Hernia, Pneumothorax, Effusion, Masses, Fibrosis, Atelectasis, Consolidation, Pleural Thickening, Nodules and Pneumonia.

According to another aspect a device is provided, being configured for executing a method, as described herein.

According to another aspect a computer program is provided, comprising instructions to cause a computer to execute a method, as described herein.

According to another aspect, a computer-readable medium is provided having stored thereon the computer program, as described herein.

BRIEF DESCRIPTION OF THE DRAWINGS

Exemplary embodiments of the invention will now be described with reference to the following drawings, which are not to scale, wherein.

DETAILED DESCRIPTION OF THE EMBODIMENTS

Figure 1:
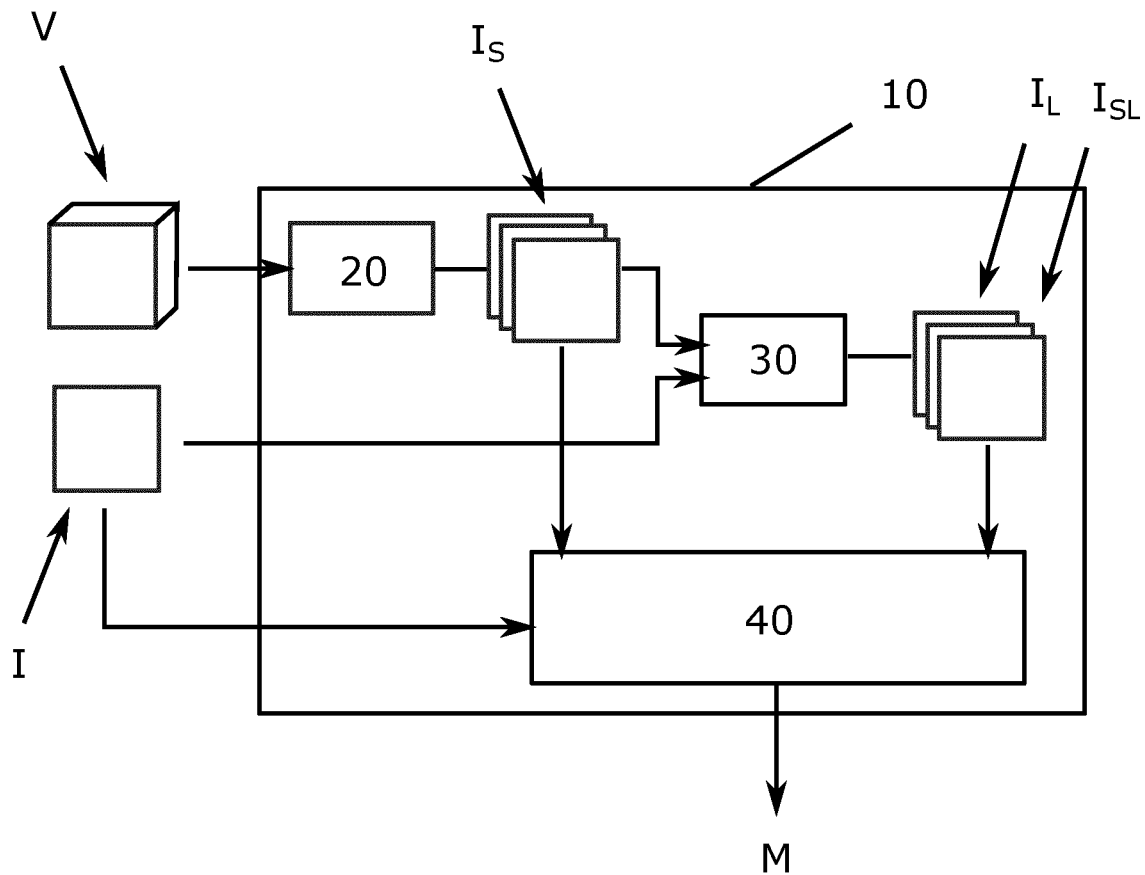
FIG. 1 shows a schematic block diagram of the device executing the multi-task deep learning method.

The device 10, described in FIG. 1 comprises a synthesis unit 20, a labeling unit 30 and a model training unit 40. The device 10 is provided with first image data in the form of 2D image data I and second image data in form of 3D volume data V. The 3D volume data V is the result of a first image recognition task, in this case from detection of a pneumothorax in X-ray imaging. The 2D image data I is the result of the second image recognition task, in this case from detection of a pneumothorax in computer tomography imaging. The first image recognition task and the second image recognition task are related to each other, in particular in view of relating to a same anatomic region where the respective image data is taken from and/or relating to a same pathology to be recognized in the respective image data.

In this case, the 3D volume data V and the 2D image data I are not of the same image datatype. In order to be mutually processed, the image datatype of the 3D volume data V and the 2D image data I have to be of the same image datatype, or at least a similar image datatype. Preferably the respective image datatype are similar in view of pixel resolution and/or synthesis geometry. Thus, the 3D volume data V had to be synthesized in to an image datatype that is similar to the image datatype of the 2D image data I. Therefore, the 3D volume data V is provided to the synthesis unit 20. The synthesis unit 20 synthesizes the 3D volume data V into an image datatype that is close to the image datatype of the 2D image data I in view of pixel resolution and synthesis geometry by synthesizing the 3D volume data V into a plurality of 2D image data. In other words, the 3D volume of the 3D volume data V is sliced into a stack of 2D image data. In this case, the synthesis of the 3D volume data V from the computer tomography image is called digitally reconstructed radiograph, DDR. Thus, the 3D volume data V is synthesized in to synthesized 2D image data $I_S$. The synthesis 2D image data $I_{PS}$ is then provided to the labeling unit 30.

In image recognition basically two image recognition tasks are performed, namely segmentation and/or classification. Segmentation relates to an annotation of labels to pixels, wherein classification relates to an annotation of labels to images. Thus, in any case the provided image data has to be labeled. Therefore the labeling unit 30 is not only provided with the synthesized 2D image data $I_S$, but although with the 2D image data I. The labeling unit 30 then labels the provided image data, in particular by performing the first image recognition task on the 2D image data I and by performing the second image recognition task on the synthesized image data $I_S$, determining labeled 2D image data IL and labeled synthesized 2D image data $I_{SL}$. Thus, different architectures are possible. A first architecture comprises multi-task-learning for X-ray classification and computer tomography classification. The second architecture comprises multi-task-learning for x-ray segmentation and computer tomography segmentation. A third architecture comprises multi-task-learning for x-ray segmentation and computer tomography classification. A fourth architecture comprises multi-task-learning for x-ray classification and computer tomography segmentation The model training unit 40 is then provided with the determined labeled 2D image data $I_L$, the labeled synthesized 2D image data $I_{SL}$, the 2D image data I and the synthesized 2D image data I. The model training unit 40 then trains a model M with a neural network in particular by multi-task deep learning methods, based on the provided determined labeled 2D image data $I_L$, the labeled synthesized 2D image data $I_{SL}$, the 2D image data I and the synthesized 2D image data $I_S$. Thus, the x-ray images and the synthesized computer tomography images are used to train a network architecture with shared layers. In this case, such an approach highly increases the available training data for the neural network. Since the training data, which in this case is based on the provided 3D volume data V and the provided 2D image data I, was generated on related image recognition tasks, in this case related in view of the anatomic region and the task of detecting the same pathology, increased amount of training data is available which also enhances the accuracy of the annotation of the image data.

In general, in order to leverage the advantages of multi-task learning by means of combined training with computer tomography data and x-ray data, a hard parameter shearing approach can be used, wherein the first layers of the neural network are reused for multiple tasks. For such an application, the computer tomography data has to be adapted. This can be achieved by selecting single slices out of the computer tomography volume and resize them by interpolation or by an artificial forward synthesizes to a 2D image with the correct dimensions. Alternatively, using a soft sharing approach, every network has its own parameters, which allows also for different datatypes, while a regularization method is employed in order to encourage joined learning.

Figure 2:
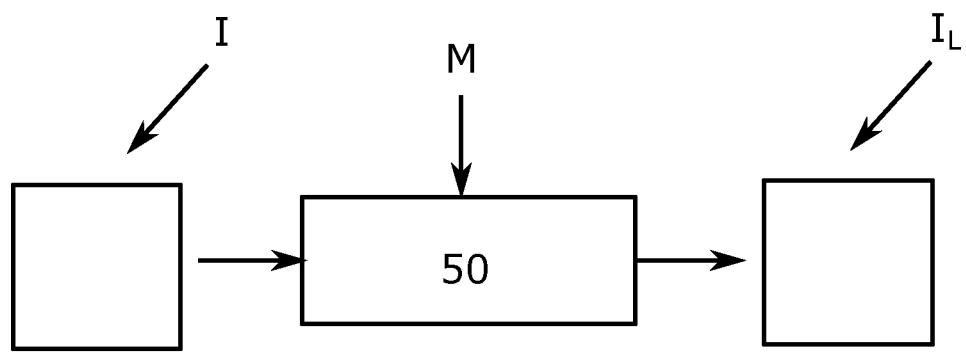
FIG. 2 shows a schematic block diagram of an application of the trained deep learning model.

As illustrated in FIG. 2, the trained model M can then be used in further applications. Therefore, model application unit 50 is provided with the trained model M. For example, the image recognition task that should be performed by the model application unit 50 comprises detection of a pneumothorax in 2D image data I generated from X-ray imaging. Thus, the 2D image data I is provided to the model application unit 50. The trained model M was trained on a relatively high number of training data, which in addition have an improved accuracy, since the model was not only trained on training data of pathology detection in 2D X-ray-imaging but also on training data of pathology detection in a similar area of the body in 3D computer tomography imaging. Thus, the model application unit 50 is able to determine labeled 2D image data $I_L$ by annotating the provided 2D image data I in an improved way.

Figure 3:
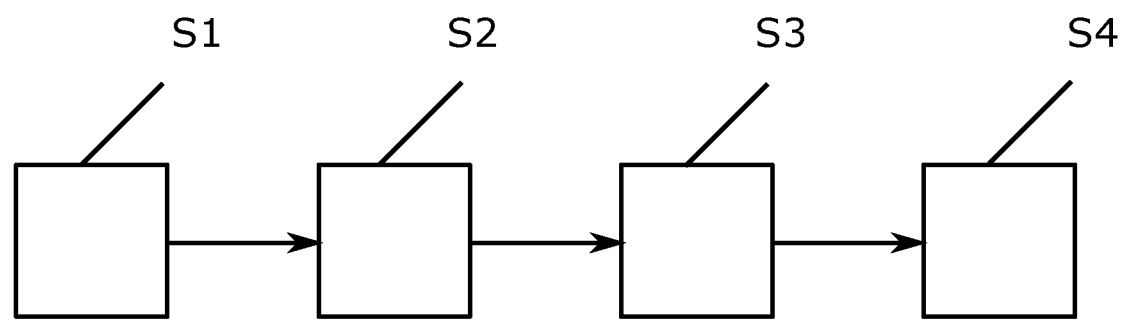
FIG. 3 shows a flow chart of the multi-task deep learning method for a neural network for automatic pathology detection.

FIG. 3 shows a flow chart of the multi-task deep learning method for a neural network for automatic pathology detection. In a first step S1, first image data I for a first image recognition task is received. In a second step S2, second image data V for a second image recognition task is received wherein the first image data I is of a first datatype and the second image data V is of a second datatype, different from the first datatype. The first image recognition task and the second image recognition task relate to a same anatomic region where the respective image data is taken from and/or relate to a same pathology to be recognized in the respective image data. In a third step S3 first labeled image data $I_L$ is determined by labeling the first image data I and second labeled synthesized image data $I_{SL}$ is determined by synthesizing and labeling the second image data V. In a fourth step S4, the neural network is trained based on the received first image data I, the received second image data V, the determined first labeled image data $I_L$ and the determined second labeled synthesized image data $I_{SL}$.

LIST OF REFERENCE SIGNS

10 device
20 synthesis unit
30 labeling unit
40 model training unit
50 model application unit
V 3D volume data
I 2D image data
$I_S$ synthesized 2D image data
$I_L$ labeled 2D image data (first labeled image data)
$I_{SL}$ labeled synthesized 2D image data (second labeled synthesized image data)
M model
S1 receiving first image data
S2 receiving second image data
S3 determining first labeled image data
S4 training the neural network

The invention claimed is:

1. A multi-task deep learning method for a neural network for automatic pathology detection, comprising:
   receiving first image data for a first image recognition task;
   receiving second image data for a second image recognition task, wherein the first image data is of a first datatype, and the second image data is of a second datatype being different from the first datatype;
   labeling the first image data;
   synthesizing the second image data into the first datatype and/or first dimension;
   labeling the synthesized second image data; and
   training the neural network based on the received first image data, the received second image data, the labeled first image data and the synthesized labeled second image data;
   wherein the first image recognition task and the second image recognition task relate to a same anatomic region where the respective image data is taken from and/or relate to a same pathology to be recognized in the respective image data.

2. The method of claim 1, wherein the first image recognition task and/or the second image recognition task comprises at least one of classification, localization, object detection and/or segmentation.

3. The method of claim 2, wherein the classification, the localization, the object detection and/or the segmentation relates to at least one of a pathology, a foreign object and/or an anatomical region.

4. The method of claim 1, wherein the first datatype comprises 2D image data, and wherein the second datatype comprises 3D image data.

5. The method of claim 1, wherein the first image data is of a first dimension, and the second image data is of a second dimension, being different from the first dimension.

6. The method of claim 1, wherein the labeled first image data and the synthesized labeled second image data comprise at least one of an identification and/or a location of a pathology, a foreign object, and/or an anatomical region.

7. The method of claim 1, wherein the first image data comprises X-ray image data, and wherein the second image data comprises computed tomography image data.

8. The method of claim 7, wherein the computed tomography image data is synthesized into 2D image data in form of a digitally reconstructed radiograph.

9. The method of claim 1, wherein the pathology comprises at least one of Cardiomegaly, Emphysema, Edema, Hernia, Pneumothorax, Effusion, Masses, Fibrosis, Atelectasis, Consolidation, Pleural Thickening, Nodules, and Pneumonia.

10. A device for automatic pathology detection using a multi-task deep learning method in a neural network, comprising:
- a memory that stores a plurality of instructions; and
- a processor coupled to the memory and configured to execute the plurality of instructions to carry out a method comprising:
    - receiving first image data for a first image recognition task;
    - receiving second image data for a second image recognition task, wherein the first image data is of a first datatype, and the second image data is of a second datatype being different from the first datatype;
    - labeling the first image data;
    - synthesizing the second image data into the first datatype and/or first dimension;
    - labeling the synthesized second image data; and
    - training the neural network based on the received first image data, the received second image data, the labeled first image data and the synthesized labeled second image data, wherein the first image recognition task and the second image recognition task relate to a same anatomic region where the respective image data is taken from and/or relate to a same pathology to be recognized in the respective image data.

* * * * *